(12) United States Patent
Tsai (10) Patent No.: US 12,105,376 B2
(45) Date of Patent: Oct. 1, 2024

(54) OPTICAL SHEET, BACKLIGHT UNIT, LIQUID CRYSTAL DISPLAY APPARATUS, AND INFORMATION DEVICE

(71) Applicant: KEIWA Inc., Tokyo (JP)

(72) Inventor: Chengheng Tsai, Tokyo (JP)

(73) Assignee: KEIWA INCORPORATED, Tokyo (JP)

(*) Notice: Subject to any disclaimer, the term of this patent is extended or adjusted under 35 U.S.C. 154(b) by 189 days.

(21) Appl. No.: 17/891,409

(22) Filed: Aug. 19, 2022

(65) Prior Publication Data
US 2023/0038442 A1 Feb. 9, 2023

Related U.S. Application Data (63) Continuation of application No. PCT/JP2021/005710, filed on Feb. 16, 2021.

(30) Foreign Application Priority Data

Mar. 30, 2020 (JP) ................................. 2020-059508
Dec. 10, 2020 (JP) ................................. 2020-204935

(51) Int. Cl.
G02F 1/00 (2006.01)
G02F 1/1335 (2006.01)
G02F 1/13357 (2006.01)

(52) U.S. Cl.
CPC .. *G02F 1/133607* (2021.01); *G02F 1/133603* (2013.01); *G02F 1/133611* (2013.01)

(58) Field of Classification Search
CPC .. G02B 6/0053; G02B 6/0025; G02B 5/0226; G02B 5/0231
See application file for complete search history.

(56) References Cited

U.S. PATENT DOCUMENTS

| 2007/0171671 | A1* | 7/2007 | Kurokawa | ........... G02B 6/0038 362/333 |
| 2008/0013323 | A1* | 1/2008 | Katsumoto | .......... G02B 6/0053 362/311.06 |
| 2008/0239728 | A1* | 10/2008 | Chiang | ................. G02B 5/045 362/339 |
| 2010/0004268 | A1 | 1/2010 | Li et al. | |

FOREIGN PATENT DOCUMENTS

| JP | 2002-357706 A | 12/2002 |
| JP | 3114467 U | 10/2005 |

(Continued)

OTHER PUBLICATIONS

International Search Report and Written Opinion for PCT/JP2021/005710 (ISA/JP) mailed Apr. 20, 2021 (12 pages).

*Primary Examiner* — Gerald J Sufleta, II
(74) *Attorney, Agent, or Firm* — Alston & Bird LLP (57) ABSTRACT

An optical sheet 43 is built into a liquid crystal display apparatus in which a plurality of light sources 42 are dispersed on a back surface side of a display screen. One surface of the optical sheet 43 has an uneven surface. In a predetermined region R on the one surface of the optical sheet 43, a luminance enhancer 25 that improves the total light transmittance of the predetermined region R is provided so as to at least partially fill recesses 22a of the uneven surface.

17 Claims, 8 Drawing Sheets

(56) References Cited

U.S. PATENT DOCUMENTS

2011/0051037 A1\* 3/2011 Kim .................. G02F 1/133603
            362/235
2020/0379298 A1\* 12/2020 Notoshi ............ G02F 1/133603
2021/0389628 A1\* 12/2021 Nishida ............ G02F 1/133606

FOREIGN PATENT DOCUMENTS

| JP | 2008-003232 A | 1/2008 |
| JP | 2009-238491 A | 10/2009 |
| JP | 2011-076115 A | 4/2011 |
| JP | 2011-129277 A | 6/2011 |
| JP | 2019-101142 A | 6/2019 |
| TW | 201539048 A | 10/2015 |
| WO | WO 2005/083475 A1 | 9/2005 |
| WO | WO 2006/088203 A1 | 8/2006 |

\* cited by examiner

OPTICAL SHEET, BACKLIGHT UNIT, LIQUID CRYSTAL DISPLAY APPARATUS, AND INFORMATION DEVICE

CROSS-REFERENCE TO RELATED APPLICATIONS

The present disclosure is a continuation of International Patent Application Serial No. PCT/JP2021/005710, filed Feb. 16, 2021, which international application further claims priority to and the benefit of Japanese Patent Application Serial No. 2020-204935, filed Dec. 10, 2020, and Japanese Patent Application Serial No. 2020-059508, filed Mar. 30, 2020; the entire contents of all of which as are hereby incorporated by reference herein in their entireties.

BACKGROUND

Related Field

The present disclosure relates to an optical sheet, a backlight unit, a liquid crystal display apparatus, and an information device.

Related Art

In recent years, liquid crystal display apparatuses (hereinafter also referred to as liquid crystal displays) have been widely used as display apparatuses for various information devices such as smartphones and tablet terminals. A backlight of a liquid crystal display is mostly a direct type in which light sources are arranged on the back surface of a liquid crystal panel, or an edge light type in which a light source is arranged near a side surface of the liquid crystal panel.

In a case of adopting the direct type backlight, a diffusion member (a diffusion plate, a diffusion sheet, or a diffusion film) is used to avoid making the light source itself such as light emitting diodes (LEDs) traceable through a light-emitting surface and improving uniformity of in-plane luminance.

A direct type backlight, disclosed in Japanese Unexamined Patent Publication No. 2011-129277, includes a prism sheet, a diffusion sheet, and a plurality of light sources such as LEDs, arranged on a light incident side of a liquid crystal display panel, and the light sources, the diffusion sheet, and the prism sheet are layered in this order viewed from the back surface side.

BRIEF SUMMARY

However, in a traditional direct type backlight, a reduction in luminance may take place in regions between the light sources (regions where no light source is arranged; hereinafter referred to as inter-light source regions) due to a reduction of the thickness of the backlight (reduction of distance between the light source and the diffusion sheet, reduction of the thickness of the diffusion sheet, or the like), or due to reduction of the number of light sources for a purpose of cost reduction, or the like cause.

To address this, for example, there have been attempts of improving the luminance uniformity by using a diffusion sheet having inverted pyramid-like projections and recesses or a diffusion sheet containing a large amount of a diffusion agent. These attempts, however, have not been successful in sufficiently reducing a drop in luminance in inter-light source regions and the like.

There has been another attempt of eliminating unevenness of luminance between each light source and inter-light source regions by printing a white ink in regions of a diffusion sheet immediately above the light sources. This, however, leads to a drop in luminance immediately above the light sources, inevitably leading to a drop in luminance of the entire display screen.

Given the above circumstances, it is an object of the present disclosure to provide an optical sheet that makes it possible to improve luminance uniformity while avoiding a drop in luminance of the entire display screen in a liquid crystal display apparatus.

To achieve the above object, an optical sheet related to the present disclosure is an optical sheet to be built into a liquid crystal display apparatus in which a plurality of light sources are dispersed on a back surface side of a display screen. One surface of the optical sheet has an uneven surface. In a predetermined region on the one surface of the optical sheet, a luminance enhancer that improves a total light transmittance of the predetermined region is provided so as to at least partially fill recesses of the uneven surface.

According to the above optical sheet related to the present disclosure, the luminance enhancer that improves the total light transmittance is provided in the predetermined region of the surface of the optical sheet having the uneven surface so as to at least partially fill the recesses. Examples of such a predetermined region include an inter-light source region or sheet end portions where a drop in luminance is likely to take place. Therefore, the luminance of that region is enhanced, and it is possible to improve the luminance uniformity in the liquid crystal display apparatus, while avoiding a drop in the luminance throughout the entire display screen. This optical sheet of the present disclosure can cope with a further reduction of the thickness of the backlight, or with a further reduction of the number of the light sources.

In the optical sheet related to the present disclosure, the luminance enhancer may be composed of a transparent ink. This way, the luminance of the predetermined region is enhanced through a simple method of printing the transparent ink in each recess of the predetermined region. In this case, if the transparent ink is a medium and the matrix resin constituting the optical sheet is polycarbonate, simply providing the transparent ink in the recess of the predetermined region enhances the total light transmittance of the predetermined region. Further, in this case, if the luminance enhancer is formed through dot printing using a transparent ink, the total light transmittance of the predetermined region is easily adjustable. Further, with an areal percentage of the transparent ink in the dot printing is 4% or higher, the total light transmittance of the predetermined region is significantly enhanced (e.g., approximately 10%).

In the optical sheet related to the present disclosure, a difference in refractive index between the optical sheet and the luminance enhancer may be 0.3 or less. This way, the luminance of the predetermined region is enhanced without an influence from light diffusion at the interface between the optical sheet and the luminance enhancer.

In the optical sheet related to the present disclosure, the optical sheet may contain a diffusion agent. This further improves the luminance uniformity.

In the optical sheet related to the present disclosure, the recess may have an inverted pyramid shape. This further improves the luminance uniformity.

In the optical sheet related to the present disclosure, another surface of the optical sheet may be embossed. This further improves the luminance uniformity.

In the optical sheet related to the present disclosure, the predetermined region on the one surface of the optical sheet, where the luminance enhancer is provided may be flatter than another region on the one surface of the optical sheet without the luminance enhancer. This way, the total light transmittance of the predetermined region is further improved as compared to the other region.

A backlight unit related to the present disclosure is a backlight unit built in a liquid crystal display apparatus, which leads light emitted from a plurality of light sources toward a display screen, including the above-described optical sheet related to the present disclosure between the display screen and the plurality of light sources.

Since the backlight unit of the present disclosure includes the above-described optical sheet of the present disclosure, the luminance uniformity can be improved while avoiding a drop in luminance throughout the entire display screen.

In the backlight unit related to the present disclosure, the luminance enhancer may be arranged in an intermediate region between adjacent light sources out of the plurality of light sources. This way, the luminance can be enhanced in an inter-light source region where a drop in luminance is likely to take place. In this case, the luminance enhancer may be provided to all of inter-light source regions of the optical sheet, or may be provided to some of the inter-light source regions of the optical sheet. Further, the luminance enhancer may be provided entirely to each inter-light source region of the optical sheet, or may be provided partially in each inter-light source region of the optical sheet.

In the backlight unit related to the present disclosure, a distance between the plurality of light sources and the optical sheet may be 10 mm or shorter. This way, the luminance uniformity can be improved even in a structure in which a drop in luminance is more likely to take place in the inter-light source region and the like.

In the backlight unit related to the present disclosure, the plurality of light sources may be each an LED element. This way, sufficient luminance can be achieved throughout the entire display screen, even when the number of light sources is reduced.

In the backlight unit related to the present disclosure, the plurality of light sources may be regularly arranged. This further improves the luminance uniformity.

In the backlight unit related to the present disclosure, the plurality of light sources may be arranged on a reflective sheet provided opposite to the optical sheet with respect to the plurality of light sources. This further improves the luminance uniformity.

A liquid crystal display apparatus of the present disclosure includes the above-described backlight units of the present disclosure and a liquid crystal display panel.

Since the liquid crystal display apparatus of the present disclosure includes the above-described backlight unit of the present disclosure, the luminance uniformity can be improved while avoiding a drop in luminance throughout the entire display screen.

An information device of the present disclosure includes the above described liquid crystal display apparatus of the present disclosure.

Since the information device of the present disclosure includes the above-described liquid crystal display apparatus of the present disclosure, the luminance uniformity can be improved while avoiding a drop in luminance throughout the entire display screen.

With the present disclosure, it is possible to improve luminance uniformity while avoiding a drop in luminance of the entire display screen in a liquid crystal display apparatus.

DETAILED DESCRIPTION OF VARIOUS EMBODIMENTS

Embodiment

With reference to the drawings, the following describes an optical sheet, a backlight unit, a liquid crystal display apparatus, and an information device related to an embodiment of the present disclosure. Note that the scope of the present disclosure is not limited to the following embodiments, and may be altered in any way within the scope of the technical concept of the present disclosure.

Figure 1:
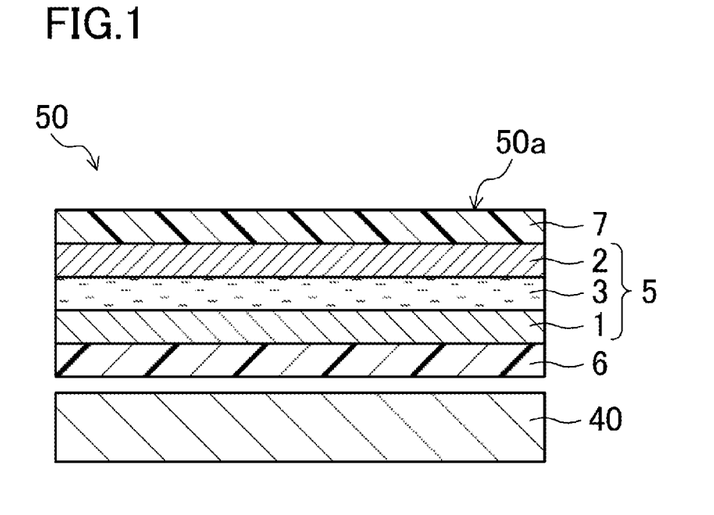
FIG. 1 is a cross-sectional view of a liquid crystal display apparatus of an embodiment.
Figure 2:
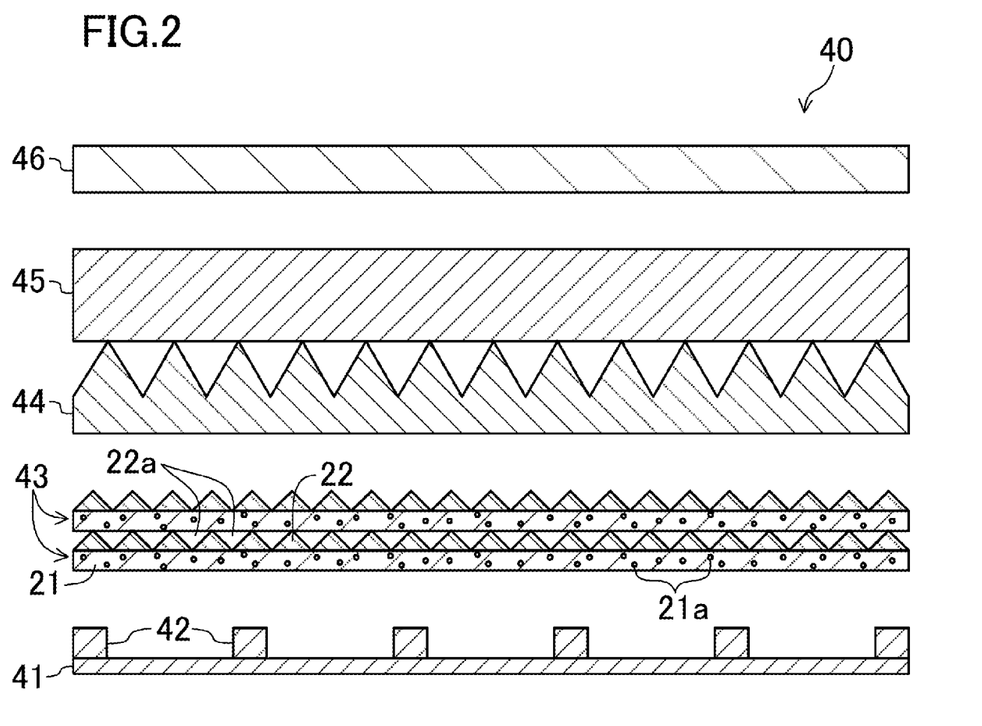
FIG. 2 is a cross-sectional view of a backlight unit of the embodiment.
Figure 3:
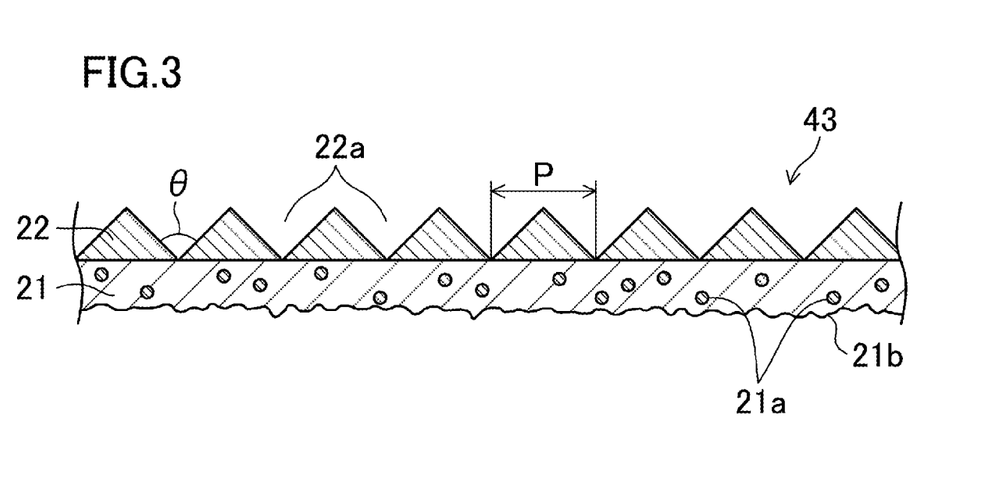
FIG. 3 is a cross-sectional view of an optical sheet of the embodiment.

FIG. 1 is an exemplary cross-sectional view of a liquid crystal display apparatus of the present embodiment. FIG. 2 is an exemplary cross-sectional view of a backlight unit of the present embodiment. FIG. 3 is an exemplary cross-sectional view of an optical sheet of the present embodiment.

As shown in FIG. 1, a liquid crystal display apparatus 50 includes a liquid crystal display panel 5, a first polarizing plate 6 attached to a lower surface of the liquid crystal display panel 5, a second polarizing plate 7 attached to an upper surface of the liquid crystal display panel 5, and a backlight unit 40 provided on a back surface side of the liquid crystal display panel 5 with the first polarizing plate 6 interposed. The liquid crystal display panel 5 includes a TFT substrate 1 and a CF substrate 2 provided so as to face each other, a liquid crystal layer 3 provided between the TFT substrate 1 and the CF substrate 2, and a sealing (not shown) provided in a frame shape to seal the liquid crystal layer 3 between the TFT substrate 1 and the CF substrate 2.

The shape of a display screen 50a of the liquid crystal display apparatus 50 viewed from the front (the top in FIG. 1) is basically a rectangle or a square; however, the shape may be any shape, such as a rectangle with rounded corners, an oval, a circle, a trapezoid, or the shape of an instrument panel of an automobile.

The liquid crystal display apparatus 50 displays an image by applying a voltage of a predetermined magnitude to the liquid crystal layer 3 in the sub-pixels corresponding to pixel electrodes, to change the alignment state of the liquid crystal layer 3 to adjust its transmission, while light from the backlight unit 40 entering through the first polarizing plate 6 is emitted through the second polarizing plate 7.

The liquid crystal display apparatus 50 of the present embodiment is used as a display apparatus incorporated in various information devices (e.g., an in-vehicle device such as a car navigation system, a personal computer, a mobile phone, a portable information terminal, a portable game machine, a copying machine, a ticket vending machine, an automated teller machine, and the like).

The TFT substrate 1 includes, for example, a plurality of TFTs arranged in a matrix on a glass substrate, an interlayer insulating film arranged in such a manner as to cover the TFTs, a plurality of pixel electrodes arranged in a matrix on the interlayer insulating film and connected to the TFTs, respectively, and an alignment film arranged in such a manner as to cover the pixel electrodes. The CF substrate 2 includes, for example, a black matrix arranged in a lattice manner on a glass substrate, a color filter including a red layer, a green layer, and a blue layer arranged in each cell of the black matrix, a common electrode arranged in such a manner as to cover the black matrix and the color filter, and an alignment film arranged in such a manner as to cover the common electrode. The liquid crystal layer 3 is made of, for example, a nematic liquid crystal material containing liquid crystal molecules having electro-optical characteristics. The first polarizing plate 6 and the second polarizing plate 7 each includes, for example, a polarizer layer having a polarization axis in one direction, and a pair of protective layers arranged in such a manner as to sandwich the polarizer layer.

As shown in FIG. 2, the backlight unit 40 includes a reflective sheet 41, a plurality of small light sources 42 two-dimensionally arranged on the reflective sheet 41, a multilayer of optical sheets 43 arranged above the plurality of small light sources 42, a first prism sheet 44 and a second prism sheet 45 sequentially arranged above the multilayer of the optical sheets 43, and a polarizing sheet 46 arranged above the second prism sheet 45. In this example, the multilayer of optical sheets 43 are formed by stacking two optical sheets 43 having the same structure.

The reflective sheet 41 is formed of, for example, a white polyethylene terephthalate resin film, a silver-deposited film, or the like.

The type of the small light sources 42 is not particularly limited. For example, an LED element, a laser element, or the like may be adopted, and an LED element may be adopted for the sake of costs, productivity, and the like. Each of the small light sources 42 may have a rectangular shape in a plan view, in which case each side may be 10 µm or more (preferably 50 µm or more) but not more than 20 mm (preferably 10 mm or less, more preferably 5 mm or less). In a case of adopting an LED as each of the small light sources 42, a plurality of LED chips each having a size of several mm square may be arranged on the reflective sheet 41 at regular intervals. Further, to adjust a light emission angle of each LED to serve as the small light source 42, a lens may be attached to the LED.

As shown in FIG. 3, each optical sheet 43 includes a diffusion layer 21 and an unevenly shaped layer 22 formed on the diffusion layer 21. The diffusion layer 21 is composed of, for example, polycarbonate as a base material (matrix resin), and contains, for example, about 0.5 to 4% by mass of a diffusion agent 21a with respect to 100% by mass of the base material. The diffusion agent 21a may be a suitable known material. A surface (lower surface) 21b of the diffusion layer 21 on the side away from the unevenly shaped layer 22 may be a mirror surface; however, may be embossed as shown in FIG. 3 to improve the diffusion characteristics. The unevenly shaped layer 22 is composed of, for example, a clear polycarbonate. On the surface of the unevenly shaped layer 22, for example, recesses 22a each having an inverted pyramid shape are two-dimensionally arranged. The vertex angles θ of the recesses 22a are 90°, for example. The recesses 22a are arranged at arrangement pitch p of about 100 µm for example. The optical sheet 43 may have a single-layer structure containing a diffusion agent and having an uneven surface. In this manner, the optical sheets 43 are not limited to the configuration shown in FIG. 3. For example, the optical sheet may have a single-layer structure with unevenness, or may be a multilayer structure of three or more layers including an uneven layer. The unevenly shaped layer is formed not only by two-dimensionally arranging the recesses in the inverted pyramid shapes as described above, and may be formed by randomly arranging projections and recesses.

The first prism sheet 44 and the second prism sheet 45 are each, for example, a film having thereon a plurality of grooves each having an isosceles triangular transversal cross-section. The vertex angle of a prism between a pair of grooves adjacent to each other is approximately 90 degrees. The grooves formed on the first prism sheet 44 and the grooves formed on the second prism sheet 45 are arranged so that each groove on the first prism sheet 44 and each groove on the second prism sheet 45 are perpendicular to each other. The first prism sheet 44 and the second prism sheet 45 may be formed as one piece. The first prism sheet 44 and the second prism sheet 45 may be, for example, made of polyethylene terephthalate (PET) film with a prism shape formed by using UV-curable acrylic resin.

For example, the polarizing sheet 46 may be the DBEF series manufactured by 3M company. The polarizing sheet 46 improves the luminance of the display screen 50a by keeping light emitted from the backlight unit 40 from being absorbed into the first polarizing plate 6 of the liquid crystal display apparatus 50.

Figure 4:
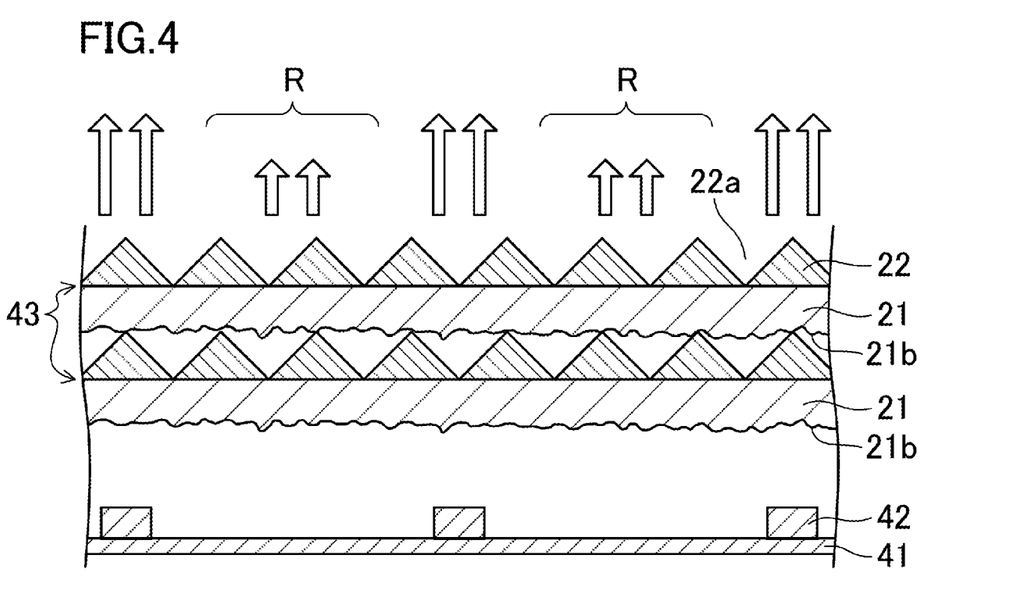
FIG. 4 is a diagram showing how luminance uniformity deteriorates in an optical sheet of a Comparative Example.
Figure 5:
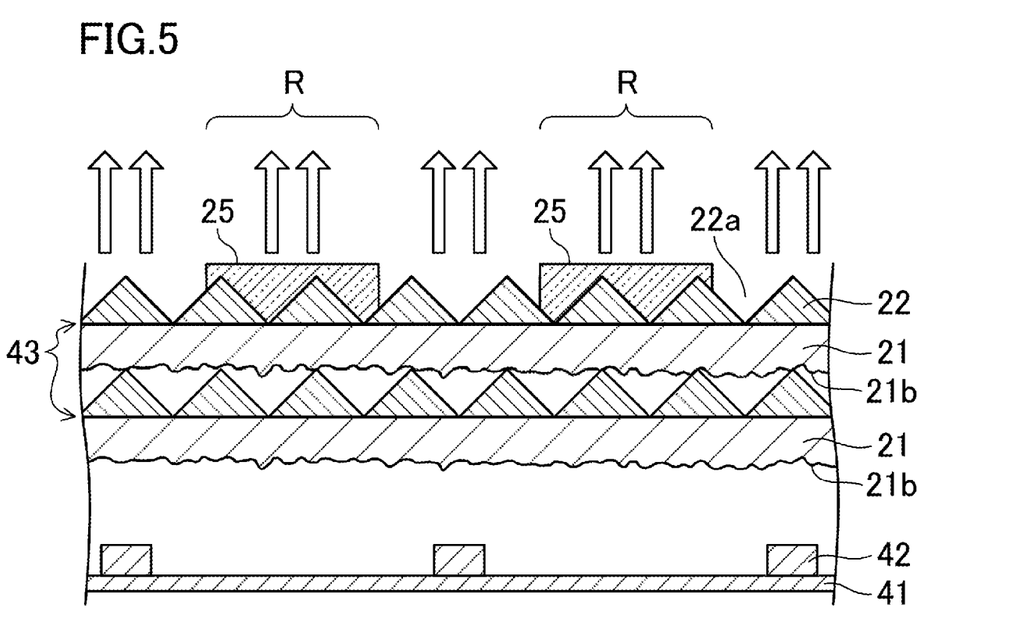
FIG. 5 is a diagram showing how luminance uniformity improves in the optical sheet of the embodiment.

As shown in FIG. 4, light emitted from the small light sources 42 is diffused by the unevenly shaped layer 22 or the diffusion agent 21a while passing through the multilayer including two layers of the optical sheets 43. This suppresses the luminance in regions immediately above the small light sources 42. However, in a case where the thickness of the backlight unit 40 is reduced by reducing the distance between the small light sources 42 and the optical sheets 43 or by reducing the thickness of the optical sheets 43, or in a case where the number of the small light sources 42 is reduced for the purpose of cost reduction, a drop in luminance takes place, for example, in inter-light source regions R (regions without the light source) or the like, as shown in FIG. 4. Note that FIG. 4 and later mentioned FIG. 5 indicate light having passed through the optical sheets 43 by arrows, and the length of each arrow represents the intensity of the light, that is, luminance. In FIG. 4 and FIG. 5, illustration of diffusion agent 21a is omitted.

To address this, in the present embodiment, each inter-light source region R on the surface of the unevenly shaped layer 22 of the upper optical sheet 43 is provided with a luminance enhancer 25 that enhances total light transmittance of the inter-light source region R, in such a manner that the recesses 22a of the unevenly shaped layer 22 is filled, as shown in FIG. 5. In other words, the total light transmittance of the inter-light source region R with the luminance enhancer 25 is higher as compared to a case without the luminance enhancer 25. The luminance enhancer 25 may be made by using a dot printable transparent ink. The difference between: the refractive index of the diffusion layer 21 and the unevenly shaped layer 22 constituting together the optical sheets 43; and the refractive index of the luminance enhancer 25 is preferably small, and may be approximately 0.3 or less. For example, the transparent ink to serve as the luminance enhancer 25 may be a medium in a case where the matrix resin of the diffusion layer 21 and the unevenly shaped layer 22 is polycarbonate. The medium may be of a UV curable type or thermosetting type, for example.

Other UV curable resins such as urethane acrylate or acrylic resin, for example, may be used as the luminance enhancer 25. As acrylic resins, UV-curable polyester acrylate, UV-curable epoxy acrylate, UV-curable polyol acrylate, or the like may be used specifically. Alternatively, for example, thermosetting resins such as phenol resins, urea resins, melamine resins, unsaturated polyester resins, diallyl phthalate resins, epoxy resins, silicon resins, alkyd resins, polyimides, polyaminobismaleimides, casein resins, furan resins, and urethane resins may be used as the luminance enhancer 25.

Note that the example shown in FIG. 5 deals with a case where the luminance enhancer 25 is provided so as to completely fill the recesses 22a in the inter-light source region R. The present disclosure, however, is not limited to this, and the luminance enhancer 25 may be provided so as to at least partially fill the recesses 22a in the inter-light source region R.

Further, in the example shown in FIG. 5, the luminance enhancer 25 is provided to all of the inter-light source regions R in the optical sheet 43; however, the luminance enhancer 25 may instead be provided to some of the inter-light source regions R in the optical sheet 43.

Further, in the example shown in FIG. 5, the luminance enhancer 25 is provided throughout each of the inter-light source regions R in the optical sheet 43; however, the luminance enhancer 25 may instead be provided to a part of each of the inter-light source regions R in the optical sheet 43.

According to the present embodiment as hereinabove described, in each of the predetermined regions of the surface of the unevenly shaped layer 22 of the optical sheet 43, specifically, in each of the inter-light source regions where a drop in luminance is likely to take place, the luminance enhancer 25 that improves the total light transmittance of that region R is provided so that the recesses 22a of the unevenly shaped layer 22 are at least partially filled. This enhances the luminance of that region R, and makes it possible to improve the luminance uniformity in the liquid crystal display apparatus 50, while avoiding a drop in the luminance throughout the entire display screen. This optical sheet 43 of the present embodiment makes it possible to cope with a further reduction of the thickness of the backlight, or with a further reduction of the number of the light sources.

Further, by forming the luminance enhancer 25 using a transparent ink in the present embodiment, the luminance of the predetermined region is enhanced simply by printing the transparent ink in the recesses 22a of the predetermined regions. In this case, if the transparent ink is a medium and the matrix resin constituting the optical sheets 43 is polycarbonate, simply providing the transparent ink in the recesses 22a of the predetermined region enhances the total light transmittance of the predetermined region. Further, in this case, if the luminance enhancer 25 is formed through dot printing using a transparent ink, the total light transmittance of the predetermined region is easily adjustable.

Further, in the present embodiment, if the difference in the refractive index of the optical sheet 43 (diffusion layer 21 and unevenly shaped layer 22) and that of the luminance enhancer 25 is 0.3 or less, the luminance of the predetermined region is enhanced by the luminance enhancer 25 without influence from light diffusion at the interface between the optical sheet 43 and the luminance enhancer 25.

Further, in a case where the optical sheet 43 (diffusion layer 21) contains the diffusion agent 21a in the present embodiment, the luminance uniformity is further improved.

Further, in a case where the recesses 22a of the unevenly shaped layer 22 each has an inverted pyramid shape in the present embodiment, the luminance uniformity is further improved.

Further, in a case where a surface 21b of the optical sheet 43 (diffusion layer 21) away from the unevenly shaped layer 22 is embossed in the present embodiment, the luminance uniformity is further improved.

Further, according to the present embodiment, in a case where the predetermined region (specifically, inter-light source region R) with the luminance enhancer 25, on the surface of the unevenly shaped layer 22 of the optical sheet 43. is flatter than another region without the luminance enhancer 25, the total light transmittance of the predetermined region is further improved as compared to the other region.

Further, with the backlight unit 40 having the optical sheet 43 according to the present embodiment, the luminance uniformity can be improved while avoiding a drop in luminance throughout the entire display screen.

Further, by arranging the luminance enhancer 25 in an intermediate region of adjacent light sources 42, out of the plurality of the light sources 42 in the backlight unit 40, that is, in the inter-light source region R, the luminance in the inter-light source region R where a drop in luminance is likely to take place can be enhanced.

Further, by setting the distance between the optical sheet 43 and the plurality of light sources 42 to 10 mm or less in the backlight unit 40, the luminance uniformity can be improved with the luminance enhancer 25, even if the structure is such that a drop in luminance likely to take place in the inter-light source region R and the like.

Further, in a case where the plurality of light sources 42 of the backlight unit 40 are each an LED element, the luminance of the entire display screen can be sufficiently achieved even if the number of the light sources is reduced.

Further, by regularly arranging the plurality of light sources 42 in the backlight unit 40, the luminance uniformity is further improved.

Further, by arranging the plurality of light sources 42 on the reflective sheet 41 provided opposite to the optical sheet 43 with respect to the plurality of light sources in the backlight unit 40, the luminance uniformity is further improved.

Further, with the liquid crystal display apparatus 50 including the backlight unit 40, or an information device including the liquid crystal display apparatus 50, the luminance uniformity can be improved while avoiding a drop in the luminance of the entire display screen.

Figure 6:
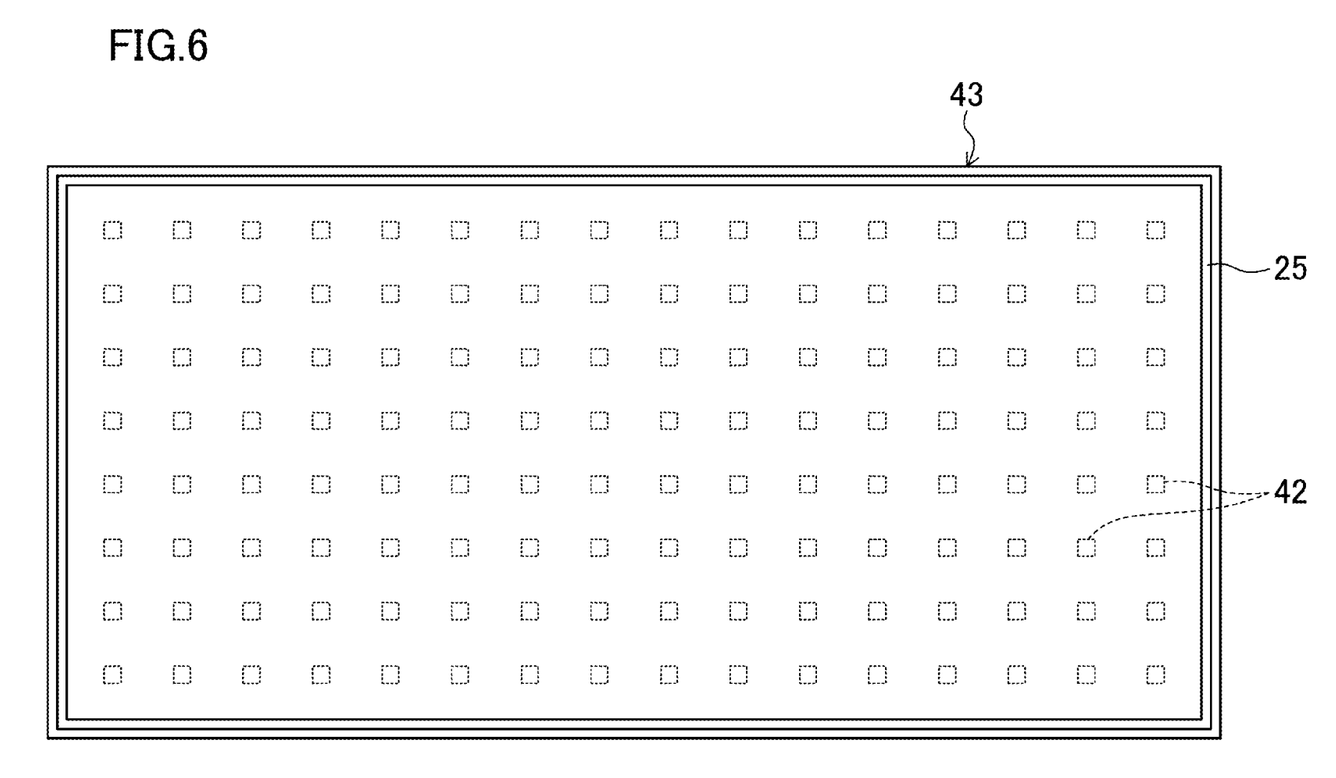
FIG. 6 is a plan view of an optical sheet of a Modification 1.
Figure 7:
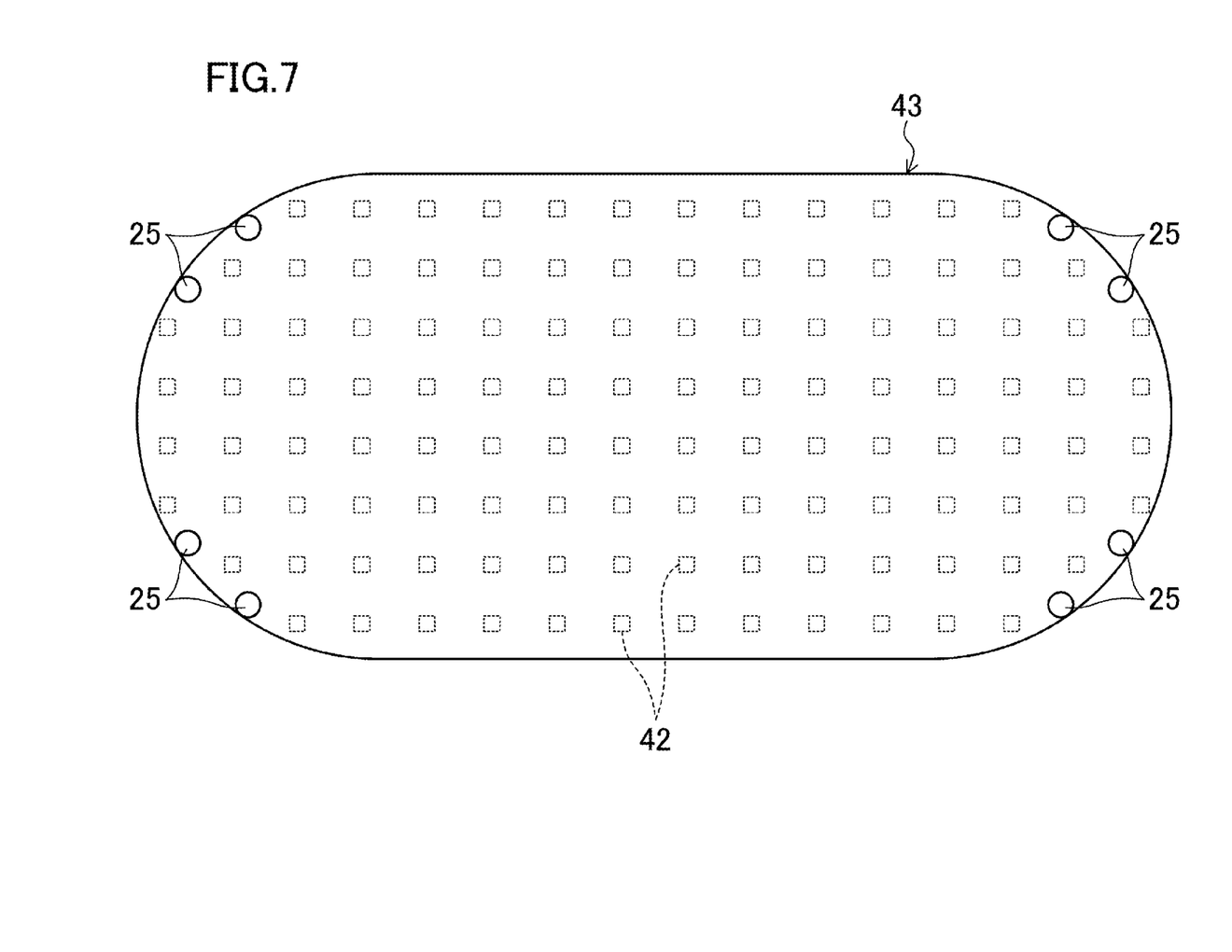
FIG. 7 is a plan view of an optical sheet of a Modification 2.
Figure 8A:
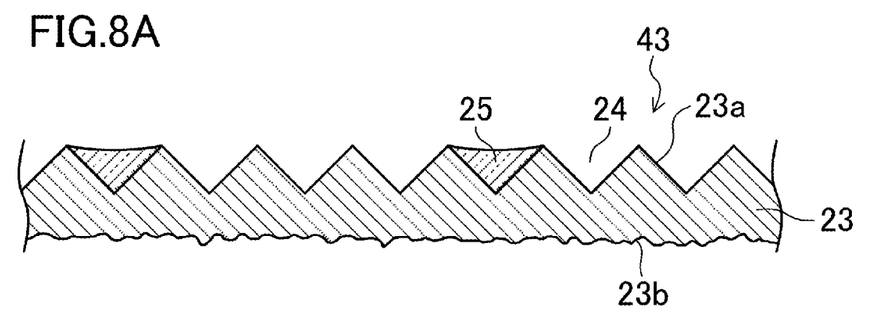
FIG. 8A is a cross-sectional view of an optical sheet of an Example 1.
Figure 8B:
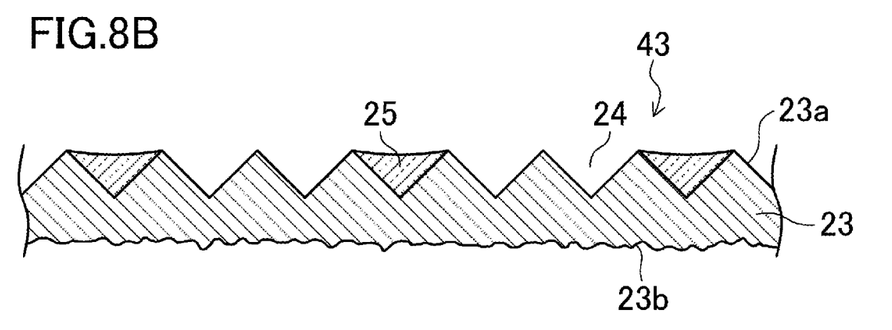
FIG. 8B is a cross-sectional view of an optical sheet of an Example 2.
Figure 8C:
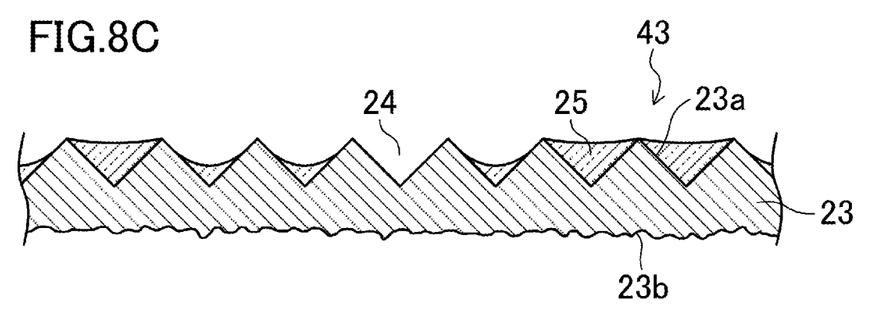
FIG. 8C is a cross-sectional view of an optical sheet of an Example 3.
Figure 8D:
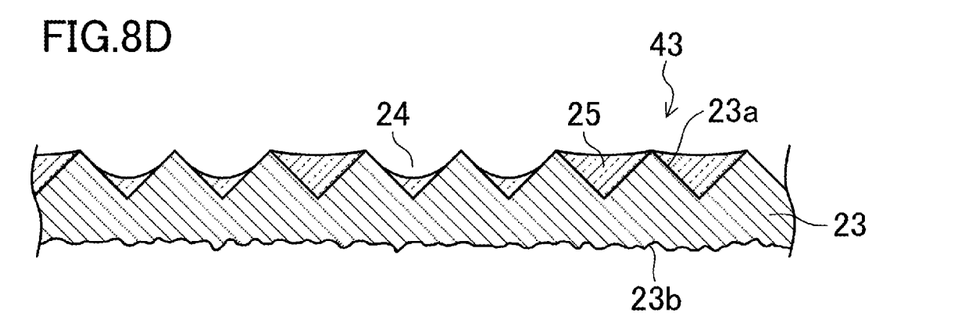
FIG. 8D is a cross-sectional view of an optical sheet of an Example 4.
Figure 8E:
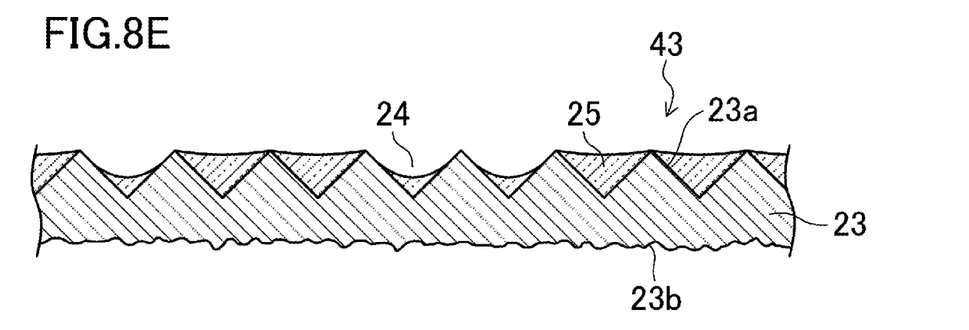
FIG. 8E is a cross-sectional view of an optical sheet of an Example 5.
Figure 8F:
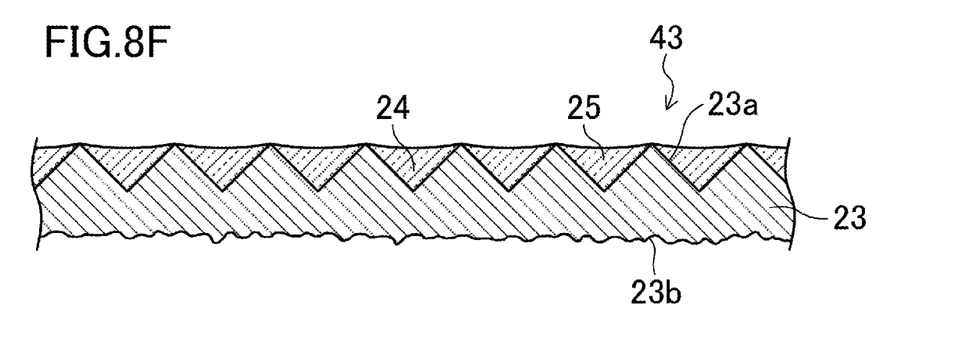
FIG. 8F is a cross-sectional view of an optical sheet of an Example 6.

Note that the present embodiment deals with a case where the luminance enhancer 25 is arranged in the inter-light source region R. However, the present disclosure is not limited to this, and the luminance enhancer 25 may be arranged in a region such as an edge portion of a sheet where the luminance drops relative to another region of backlight unit 40. For example, in a case where a drop in luminance takes place in a rim portion of a rectangular display screen, the luminance enhancer 25 may be arranged along the rim portion of an optical sheet 43 whose shape corresponds to that of the display screen, as in the case of Modification 1 shown in FIG. 6. Alternatively, in a case where luminance drops because a light source cannot be arranged in a corner portion of a track-shaped display screen, the luminance enhancer 25 may be arranged in the corner portion of the optical sheet 43, as in Modification 2 shown in FIG. 7.

Further, the present embodiment deals with a case where the luminance enhancer 25 is arranged on the surface of the unevenly shaped layer 22 of the upper optical sheet 43. However, instead of or in addition to this, the luminance enhancer 25 may be arranged on the surface of the unevenly shaped layer 22 of the lower optical sheet 43.

In the present embodiment, the number of the small light sources 42 is not particularly limited. However, to be distributed, the small light sources 42 may be arranged regularly on the reflective sheet 41 in one preferred embodiment. The "arranged regularly" means that arranged with a certain regularity. Examples include the case where the small light sources 42 are arranged at equal intervals. If the small light sources 42 are arranged at equal intervals, the distance between the centers of two adjacent small light sources 42 may fall within a range from 0.5 mm (2 mm in one preferred embodiment) to 20 mm. A distance of 0.5 mm or more between the centers of two adjacent small light sources 42 tends to cause a phenomenon (luminance unevenness) that the region between the adjacent small light sources 42 has a lower luminance than the other regions. This makes the luminance enhancer 25 more useful.

According to the present embodiment, while the upper surfaces (i.e., the surfaces closer to the first prism sheet 44) of the light optical sheets 43 are uneven (i.e. has recesses 22a), at least one of the surfaces of each optical sheet 43 may be uneven. That is, the lower surface (i.e., the surface closer to the small light source 42) or both of the surfaces (i.e., the upper and lower surfaces) of each optical sheet 43 may be uneven.

Further, the shape of the uneven surface on each optical sheet 43 is not particularly limited, and the uneven surface may be, for example, a matte surface with a random pitch, arrangement, or shape. Alternatively, a plurality of projections and recesses may be regularly arranged two-dimensionally.

The unevenness of the surfaces of the optical sheets 43 may include polygonal pyramids or shapes that can be approximated to polygonal pyramids. Here, the "polygonal pyramids" are triangular pyramids, quadrangular pyramids, or hexagonal pyramids, which can be arranged tightly on the surfaces of the optical sheet 43 in one preferred embodiment. In addition, the surfaces of the optical sheets 43 are formed uneven by a manufacturing process such as extrusion molding or injection molding using a die (e.g., metal rolls). In view of the accuracy in cutting the surface of the die (or each metal roll), the polygonal pyramids may be quadrangular pyramids.

Examples of the projections may include hemispheres (i.e., upper halves), cones, triangular pyramids, quadrangular pyramids, and hexagonal pyramids. Examples of the recesses may include hemispheres (i.e., lower halves), inverted cones, inverted triangular pyramids, inverted quadrangular pyramids, and inverted hexagonal pyramids.

Examples of the projections may further include substantial hemispheres (i.e., upper halves), substantial cones, substantially triangular pyramids, substantially quadrangular pyramids, and substantially hexagonal pyramids. Examples of the recesses may further include substantial hemispheres (i.e., lower halves), substantially inverted cones, substantially inverted triangular pyramids, substantially inverted quadrangular pyramids, and substantially inverted hexagonal pyramids. Here, the term "substantial(ly)" XX means that shapes can be approximated to the XX. For example, the term "substantially quadrangular pyramids" means shapes can be approximated to the quadrangular pyramids. In fact, the projections and recesses may be deformed from substantial hemispheres (i.e., upper and lower halves), substantially (inverted) cones, substantially (inverted) triangular pyramids, or substantially (inverted) quadrangular pyramids in view of the accuracy in industrial production. There may be inevitable variations in the shapes caused by the processing accuracy of industrial production.

If a plurality of projections and recesses are arranged two-dimensionally on the surfaces of the optical sheets 43, the projections and recesses may be arranged tightly on the entire surfaces of the optical sheets 43. Alternatively, the projections and recesses may be arranged at regular intervals (i.e., a constant pitch) or random intervals.

Further, the material of the diffusion agent 21a contained in the optical sheets 43 (diffusion layer 21) is not particularly limited in the present embodiment. Examples may include silica, titanium oxide, aluminum hydroxide, and barium sulfate as inorganic particles, as well as acrylic, acrylonitrile, silicone, polystyrene, and polyamide as organic particles.

The particle size of the diffusion agent 21a may fall within a range from, for example, 0.1 µm (preferably 1 µm) to 10 µm (preferably 8 µm), both inclusive in view of the light diffusing effect.

The concentration of the diffusion agent 21a may fall within a range from, for example, 0.1% (preferably 0.3%) by mass) by mass to 10% (preferably 8%) by mass, both inclusive, with respect to 100% by mass of the material (i.e., the matrix) of the diffusion layer 21 in view of the light diffusing effect. Further, a base material layer not containing diffusion agent 21a, such as a base material layer made of clear polycarbonate, may be adopted in place of the diffusion layer 21.

The difference in refractive index between the diffusion agent 21a and the matrix of the diffusion layer 21 may be 0.01 or more, preferably 0.03 or more, more preferably 0.05 or more, further more preferably 0.1 or more, and most preferably 0.15 or more. A difference of less than 0.01 between the refractive index of the diffusion agent 21a and that of the matrix of the diffusion layer 21 causes insufficient diffusion effects of the light diffusion agent 21a.

The resin to serve as the matrix of the diffusion layer 21 is not particularly limited, as long as being a material that transmits light. Examples may include acrylic, polystyrene, polycarbonate, methyl methacrylate-styrene copolymer resin (MS resin), polyethylene terephthalate, polyethylene naphthalate, cellulose acetate, and polyimide.

The thickness of the optical sheets 43 of the present embodiment is not particularly limited, but may fall, for example, within a range from 0.1 mm to 3 mm (preferably 2 mm, more preferably 1.5 mm, and further more preferably 1 mm). The optical sheets 43 with a thickness larger than 3 mm make it difficult to achieve a reduction in the thickness of the liquid crystal display. On the other hand, the optical sheets 43 with a thickness smaller than 0.1 mm makes it difficult to achieve the effect of improving the luminance uniformity, which has been described above.

If an optical sheet has a multilayer structure (e.g., the diffusion layer 21 as the lower layer and the uneven layer 22 as the upper layer) like the optical sheets 43 of the present embodiment, a layer (i.e., the unevenly shaped layer 22) with an uneven surface has a thickness that is greater than the maximum height or depth of the unevenness. For example, a layer with projections (or recesses) with a height (or depth) of 20 µm has a thickness larger than 20 µm.

Note that "optical sheet" in this specification means a sheet having various optical functions such as diffusion, light collection, refraction, reflection, and the like. While some of the optical sheets 43 of the present embodiment may include the diffusion layer 21 having thereon the unevenly shaped layer 22, the optical sheet 43 may be replaced with a single-layer optical sheet 43 containing a diffusion agent and having an uneven surface. Alternatively, the optical sheet 43 may be an optical sheet 43 made of three layers or more including the diffusion layer 21 and the unevenly shaped layer 22. Alternatively, the diffusion layer 21 and the unevenly shaped layer 22 may be separate optical sheets, and these optical sheets may be layered or separately arranged. In the latter case, the unevenly shaped layer 22 may be disposed closer to the small light source 42. Alternatively, the optical sheet 43 may be structured only by the diffusion layer 21, and the uneven surface may be provided on the lower surface of the first prism sheet 44. That is, the uneven surface may be provided on either one of the surfaces of the optical sheet constituting the backlight unit 40, and the luminance enhancer 25 may be provided so as to at least partially fill the recesses of the uneven shape in a predetermined region of the optical sheet, in which region luminance relatively drops.

A method of manufacturing the optical sheet 43 is not particularly limited. For example, extrusion molding or injection molding may be employed. A single-layer diffusion sheet with an uneven surface may be manufactured by extrusion molding as follows. First, plastic particles as pellets added with a diffusion agent are introduced into a single-screw extruder. The plastic particles may also include those not added with any diffusing agent. Then, the plastic particles are heated, molten, and kneaded. After that, the molten resin extruded from a T-die is sandwiched between two metal rolls, cooled and then transported by using guide rolls, and then cut off into sheet plates by a sheet cutter machine to produce diffusion sheets. Here, the molten resin is sandwiched between the metal rolls, one of which has a surface with predetermined inverted unevenness, which will be transferred onto the resin. This allows for shaping of diffusion sheets to have surfaces with the desired unevenness. However, the surface shapes of the rolls are not 100% transferred onto the resin and may thus be counted backwards from the degree of transfer to be designed.

If a two-layered diffusion sheet with uneven surfaces may be manufactured by extrusion molding, for example, plastic particles as pellets necessary for forming each layer are introduced into one of two single-screw extruders. The procedure above is then performed for each layer. The fabricated sheets are layered.

Alternatively, the two-layered diffusion sheet with an uneven surface may be manufactured as follows. First, plastic particles as pellets necessary for forming each layer are introduced into one of two single-screw extruders, and molten by heating, and kneaded. Then, molten resin to become each layer is introduced into a single T-die, where layers of multiple molten resins are stacked, and the layers of the molten resins extruded through the T-die is then sandwiched between two metal rolls and cooled. After that, the layers of molten resin are transported by guide rolls to be cut off into sheet plates using a sheet cutter machine, thus yielding a double-layer diffusion sheet with an uneven surface.

Alternatively, the optical sheets 43 may be produced by shape-transfer using ultraviolet (UV) as follows. First, an uncured ultraviolet curable resin is filled in a roll having an inverted shape of an uneven surface to be transferred, and a base material is pressed against the resin. Next, with the roll filled with UV-curing resin and the base material in one piece, the resin is cured by UV irradiation. Next, the sheet to which the shape of the uneven surface has been transferred by using the resin is released from the roll. Finally, the sheet is again irradiated with ultraviolet rays so that the resin is completely cured, thereby producing a diffusion sheet having an uneven surface.

In the present embodiment, the backlight unit 40 is a direct backlight unit in which a plurality of small light sources 42 are distributed on the back surface side of a display screen 50a of the liquid crystal display apparatus 50. A decrease in the distance between the small light sources 42 and the optical sheets 43 is needed to downsize the liquid crystal display apparatus 50. However, a decrease in this distance tends to cause the phenomenon that the regions of the display screen 50a above the spaces between the distributed small light sources 42 have a lower luminance than the other regions (i.e., non-uniformity of luminance).

In contrast, the use of the above-described optical sheets each having the luminance enhancer 25 in regions where a drop in luminance is likely to take place is useful in suppressing uneven luminance. In particular, the present disclosure is believed to be more useful if the distance between the small light sources and the optical sheets is set 15 mm or less, preferably 10 mm or less, more preferably 5 mm or less, further more preferably 2 mm or less, and ultimately 0 mm, aiming to reduce the thickness of small and mid-sized liquid crystal display in the future.

Examples and Comparative Examples

The following describes optical sheets of Examples and Comparative Examples, with reference to the drawings. FIG. 8A to FIG. 8F are cross-sectional views of optical sheets according to Examples 1 to 6, respectively.

As shown in FIG. 8A to FIG. 8F, optical sheets 43 of Examples 1 to 6 each has an uneven surface including recesses 24 of an inverted pyramid shape formed on a surface 23a (surface away from the light sources) of a base material layer 23 of 160 µm in thickness made of polycarbonate, and has its back surface 23b (surface closer to the light sources) embossed. The depth and arrangement pitch of each recess 24 is 50 µm and 100 µm, respectively. Although illustration is omitted, the base material layer 23 contains a diffusion agent.

As shown in FIG. 8A to FIG. 8F, the optical sheets 43 of Examples 1 to 6 has the above-described luminance enhancer 25 in some of the recesses 24 on the side of the surface 23a of the base material layer 23. The luminance enhancer 25 was provided by dot printing with a dot diameter of 80 µm, with areal percentages of 4%, 10%, 30%, 50%, 65%, and 100%, using a transparent ink made of a medium. The term "areal percentages" herein refers to a setting parameter of a printing machine that performs the dot printing, and do not necessarily correspond to areal percentages of the transparent ink on the surface 23a of the base material layer 23. The dot printing with an areal percentage of 100% is so-called solid printing. Further, although illustration is omitted, an optical sheet as "Comparative Example 1" was prepared using the identical base material layer 23 as that of the optical sheets 43 of Examples 1 to 6, except in that dot printing using the transparent ink was not performed (i.e., luminance enhancer 25 was not provided).

For each of the optical sheets 43 of Examples 1 to 6 and the optical sheet of Comparative Example 1, the haze and the total light transmittance (relative values where the transmittance of Comparative Example 1 without dot printing is defined as "1") when light is perpendicularly incident from the back surface 23b of the base material layer 23 are shown in Table 1 below together with the dot printing areal percentages. Here, the haze and the total light transmittance of each optical sheet were measured with a haze meter HZ-2 manufactured by Suga Test Instruments Co., Ltd.

TABLE 1

|  | COMPARATIVE EXAMPLE 1 NO PRINTING | EXAMPLE 1 DOT PRINTING | EXAMPLE 2 DOT PRINTING | EXAMPLE 3 DOT PRINTING | EXAMPLE 4 DOT PRINTING | EXAMPLE 5 DOT PRINTING | EXAMPLE 6 SOLID PRINTING |
|---|---|---|---|---|---|---|---|
| AREAL PERCENTAGE (%) OF DOT PRINTING | 0 | 4 | 10 | 30 | 50 | 65 | 100 |
| HAZE (%) | 93.9 | 93.7 | 93.5 | 93.3 | 93.6 | 92.4 | 92.2 |
| RATIO OF TOTAL LIGHT TRANSMITTANCE TO PRODUCT WITHOUT PRINTING | 1.00 | 1.10 | 1.22 | 1.57 | 1.63 | 1.67 | 1.68 |

As shown in Table 1, the total light transmittance increased with an increase in the areal percentage of the dot printing using the transparent ink to serve as the luminance enhancer 25. On the other hand, a drop in the haze (diffusivity) was suppressed even with an increase in the areal percentage of the dot printing using the transparent ink to serve as the luminance enhancer 25. For example, the solid printing in Example 6 resulted in a 68% increase in the transmission as compared to no-printing in Comparative Example 1, while a drop in the haze was 1.7%. Further, the dot printing of 4% in areal percentage in Example 1 also resulted in a significant increase of 10% in transmission as compared to the no-printing in Comparative Example 1, while the drop in the Haze was 0.2%. Note that, in an actual backlight, another optical film such as a prism sheet is layered on these optical sheets. Therefore, an increased rate of the total light transmittance does not directly translate into an increased rate of the luminance. However, it goes without saying that the higher the total light transmittance, the higher the luminance. Therefore, by adjusting the areal percentage of the dot printing, a luminance enhancer 25 with the total light transmittance according to the degree of the drop in luminance in a region where the luminance drop takes place can be easily formed. In other words, a region where luminance drops and the degree of the drop in luminance are studied in advance. Then, in that region of the optical sheet 43, the luminance enhancer 25 is formed by dot printing with the areal percentage corresponding to the degree of the luminance drop, using a transparent ink. This way, the luminance uniformity can be improved.

Tables 2 and 3 show the measurement results of the arithmetic mean roughness Ra and the maximum heights Rz and Ry of the surface 23a of the base material layer 23 of the optical sheet (without printing) of Comparative Example 1 and the optical sheet 43 (solid printing) of Example 6, respectively.

TABLE 2

| NO PRINTING | N1 | N2 | N3 | N4 | N5 | N6 | N7 | N8 | N9 | N10 | MEAN | MAXIMUM |
|---|---|---|---|---|---|---|---|---|---|---|---|---|
| Ra (μm) | 11.781 | 1.839 | 3.121 | 6.762 | 9.278 | 0.755 | 11.765 | 6.958 | 0.855 | 3.249 | 5.636 | 11.781 |
| Rz (μm) | 42.075 | 7.406 | 11.419 | 20.891 | 27.71 | 3.45 | 40.782 | 21.4 | 3.77 | 11.265 | 19.017 | 42.075 |
| Ry (μm) | 43.035 | 9.433 | 13.562 | 21.9 | 29.696 | 5.058 | 41.642 | 22.646 | 6.137 | 12.897 | 20.601 | 43.035 |

TABLE 3

| SOLID PRINTING | N1 | N2 | N3 | N4 | N5 | N6 | N7 | N8 | N9 | N10 | MEAN | MAXIMUM |
|---|---|---|---|---|---|---|---|---|---|---|---|---|
| Ra (μm) | 1.43 | 1.282 | 1.074 | 1.096 | 0.713 | 0.73 | 0.75 | 1.333 | 0.685 | 1.337 | 1.043 | 1.43 |
| Rz (μm) | 7.156 | 7.862 | 4.602 | 6.025 | 3.391 | 4.471 | 3.652 | 8.234 | 3.889 | 6.056 | 5.534 | 8.234 |
| Ry (μm) | 10.041 | 10.694 | 8.597 | 8.189 | 5.904 | 6.584 | 6.077 | 10.953 | 6.013 | 8.847 | 8.19 | 10.953 |

Ra, Rz, and Ry shown in Table 2 and Table 3 were measured at ten different positions (N1 to N10) along a direction parallel to the arrangement direction of the recesses 24 each formed in a substantially inverted quadrangular pyramid using a contact-type roughness meter SJ-210 (manufactured by Mitutoyo Corporation) in accordance with JIS B0606-1994 at a measurement speed of 0.5 mm/s, a measurement range of 4 mm, and a cut-off value λc of 0.8 mm. Table 2 and Table 3 also show mean values and maximum values of the measured Ra, Rz, and Ry.

Figure 9A:
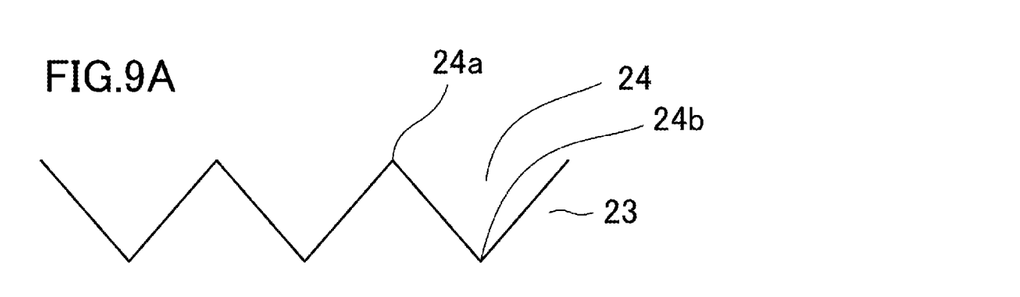
FIGS. 9A and 9B are diagrams showing a cross-section of a recess formed into a shape of an inverted quadrangular pyramid.
Figure 9B:
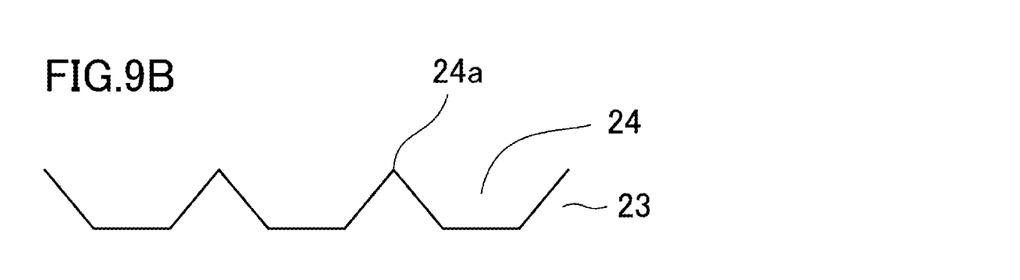

As shown in FIGS. 9A-B, on the surface of the base material layer 23, adjacent recesses (inverted quadrangular pyramids) 24 are partitioned by ridge lines 24*a*. Therefore, in a case without the luminance enhancer 25 (printing), the surface becomes rough (FIG. 9A), if the measurement cross-section passes through the valleys 24*b* of the recesses (inverted quadrangular pyramids) 24. On the other hand, the surface becomes smoother (FIG. 9B) if the measurement cross-section is deflected from the valleys 24*b* of the recesses (inverted quadrangular pyramids) 24. Therefore, as shown in Table 2 and Table 3, Ra, Rz, and Ry were measured at a plurality of positions, and the surface roughness was evaluated based on the mean value and the maximum value of the measured values.

The average values and maximum values of Ra, Rz, and Ry of Example 6 (solid printing) shown in Table 3 are smaller than any of the mean values and maximum values of Ra, Rz, and Ry of Comparative Example 1 (no printing) shown in Table 2. That is, it should be understood that, with the luminance enhancer 25, the resin of the ink is filled in the recesses (inverted quadrangular pyramids) 24, and smoothen the surface of the base material layer 23.

The above describes embodiments (including examples; the same applies hereinafter) of the present disclosure. However, the present disclosure is not limited only to the aforementioned embodiments, and various modifications are possible within the scope of the disclosure. That is, the above description of the embodiments is solely to serve as an example in nature, and is not intended to limit the present disclosure, applications thereof, or uses thereof.

For example, the above-described embodiment deals with a case where a transparent ink is used as the luminance enhancer 25. However, the present disclosure is not limited to this, and any highly transparent material that can improve the total light transmittance by filling the recesses of the optical sheets 43 can be used as the luminance enhancer 25. Examples of such a highly transparent material adoptable include a material obtained by dispersing a white pigment composed of an inorganic substance such as alumina, titanium oxide, barium sulfate, zinc oxide, or calcium carbonate or a urea-based organic substance in a vehicle (varnish: resin dissolved in a solvent). Further, the method of forming the luminance enhancer 25 is not limited to dot printing, and it goes without saying that a known pattern formation method and the like may be adopted.

The invention claimed is:

1. A diffusion sheet provided between a plurality of light sources and a prism sheet a liquid crystal display apparatus in which the plurality of light sources are dispersed on a back surface side of a display screen, wherein:
   one surface of the diffusion sheet has an uneven surface; and
   in a predetermined region on the one surface of the diffusion sheet, a luminance enhancer that improves a total light transmittance of the predetermined region is provided so as to at least partially fill recesses of the uneven surface.

2. The diffusion sheet of claim 1, wherein the luminance enhancer is composed of a transparent ink.

3. The diffusion sheet of claim 2, wherein;
   the transparent ink is a medium; and
   a matrix resin constituting the diffusion sheet is polycarbonate.

4. The diffusion sheet of claim 2, wherein the luminance enhancer is formed by dot printing using the transparent ink.

5. The diffusion sheet of claim 4, wherein an areal percentage of the transparent ink in the dot printing is 4% or higher.

6. The diffusion sheet of claim 1, wherein a difference in refractive index between the diffusion optical sheet and the luminance enhancer is 0.3 or less.

7. The diffusion sheet of claim 1, wherein the diffusion sheet contains a diffusion agent.

8. The diffusion sheet of claim 1, wherein the recess has an inverted pyramid shape.

9. The diffusion sheet of claim 8, wherein another surface of the diffusion optical sheet is embossed.

10. The diffusion sheet of claim 1, wherein the predetermined region on the one surface of the diffusion sheet, where the luminance enhancer is provided, is flatter than another region on the one surface of the diffusion sheet without the luminance enhancer.

11. A backlight unit built in a liquid crystal display apparatus, which leads light emitted from a plurality of light sources toward a display screen, the backlight unit comprising the diffusion sheet of claim 1 between the display screen and the plurality of light sources.

12. The backlight unit of claim 11, wherein the luminance enhancer is arranged in an intermediate region between adjacent light sources out of the plurality of light sources.

13. The backlight unit of claim 11, wherein a distance between the plurality of light sources and the diffusion sheet is 10 mm or shorter.

14. The backlight unit of claim 11, wherein the plurality of light sources are each an LED element.

15. The backlight unit of claim 11, wherein the plurality of light sources are regularly arranged.

16. The backlight unit of claim 11, wherein the plurality of light sources are arranged on a reflective sheet opposite to the diffusion sheet with respect to the plurality of light sources.

17. A liquid crystal display apparatus, comprising:
   the backlight unit of claim 11; and
   a liquid crystal display panel.

\* \* \* \* \*

UNITED STATES PATENT AND TRADEMARK OFFICE
CERTIFICATE OF CORRECTION

PATENT NO. : 12,105,376 B2
APPLICATION NO. : 17/891409
DATED : October 1, 2024
INVENTOR(S) : Chengheng Tsai It is certified that error appears in the above-identified patent and that said Letters Patent is hereby corrected as shown below:

On the Title Page

Please delete the Title page and insert the attached Title Page showing the corrected number of claims.

In the Claims

At Column 15, Line 58, Claim 1, delete "a liquid crystal display apparatus" and insert -- in a liquid crystal display apparatus --, therefor.

At Column 16, Line 58, after Claim 17, insert -- 18. An information device, comprising the liquid crystal display apparatus of claim 17. --.

Signed and Sealed this
Third Day of December, 2024

Katherine Kelly Vidal
*Director of the United States Patent and Trademark Office*

(12) United States Patent
Tsai

(10) Patent No.: US 12,105,376 B2
(45) Date of Patent: Oct. 1, 2024

(54) OPTICAL SHEET, BACKLIGHT UNIT, LIQUID CRYSTAL DISPLAY APPARATUS, AND INFORMATION DEVICE

(71) Applicant: KEIWA Inc., Tokyo (JP)

(72) Inventor: Chengheng Tsai, Tokyo (JP)

(73) Assignee: KEIWA INCORPORATED, Tokyo (JP)

(*) Notice: Subject to any disclaimer, the term of this patent is extended or adjusted under 35 U.S.C. 154(b) by 189 days.

(21) Appl. No.: 17/891,409

(22) Filed: Aug. 19, 2022

(65) Prior Publication Data
US 2023/0038442 A1 Feb. 9, 2023

Related U.S. Application Data

(63) Continuation of application No. PCT/JP2021/005710, filed on Feb. 16, 2021.

(30) Foreign Application Priority Data

Mar. 30, 2020 (JP) .................. 2020-059508
Dec. 10, 2020 (JP) .................. 2020-204935

(51) Int. Cl.
G02F 1/00 (2006.01)
G02F 1/1335 (2006.01)
G02F 1/13357 (2006.01)

(52) U.S. Cl.
CPC .. *G02F 1/133607* (2021.01); *G02F 1/133603* (2013.01); *G02F 1/13361I* (2013.01)

(58) Field of Classification Search
CPC .. G02B 6/0053; G02B 6/0025; G02B 5/0226; G02B 5/0231
See application file for complete search history.

(56) References Cited

U.S. PATENT DOCUMENTS

2007/0171671 A1* 7/2007 Kurokawa ........ G02B 6/0038
362/333
2008/0013323 A1* 1/2008 Katsumoto ...... G02B 6/0053
362/311.06
2008/0239728 A1* 10/2008 Chiang ............. G02B 5/045
362/339
2010/0004268 A1 1/2010 Li et al.
(Continued)

FOREIGN PATENT DOCUMENTS

JP 2002-357706 A 12/2002
JP 3114467 U 10/2005
(Continued)

OTHER PUBLICATIONS

International Search Report and Written Opinion for PCT/JP2021/005710 (ISA/JP) mailed Apr. 20, 2021 (12 pages).

*Primary Examiner* — Gerald J Sufleta, II
(74) *Attorney, Agent, or Firm* — Alston & Bird LLP

(57) ABSTRACT

An optical sheet 43 is built into a liquid crystal display apparatus in which a plurality of light sources 42 are dispersed on a back surface side of a display screen. One surface of the optical sheet 43 has an uneven surface. In a predetermined region R on the one surface of the optical sheet 43, a luminance enhancer 25 that improves the total light transmittance of the predetermined region R is provided so as to at least partially fill recesses 22a of the uneven surface.

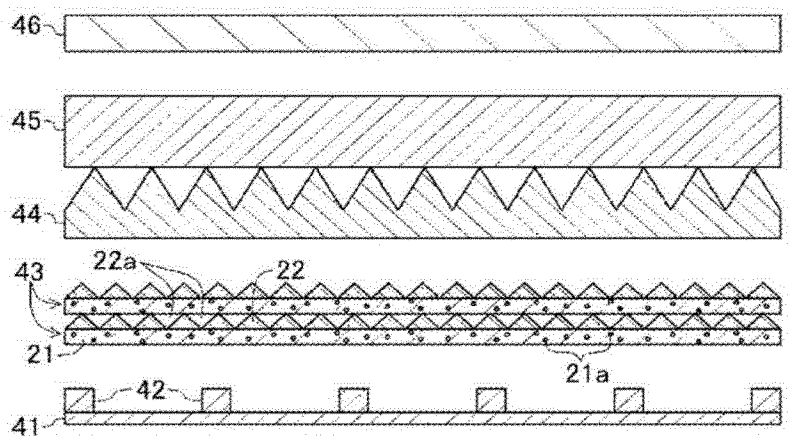

18 Claims, 8 Drawing Sheets